June 2, 1953  M. E. ABITZ  2,640,581
AUTOMATIC STATION-TO-STATION DELIVERY CONVEYER MEANS
Filed Feb. 7, 1949  3 Sheets-Sheet 1

INVENTOR.
Melvin E. Abitz
BY
Attorney

June 2, 1953 — M. E. ABITZ — 2,640,581
AUTOMATIC STATION-TO-STATION DELIVERY CONVEYER MEANS
Filed Feb. 7, 1949 — 3 Sheets-Sheet 2
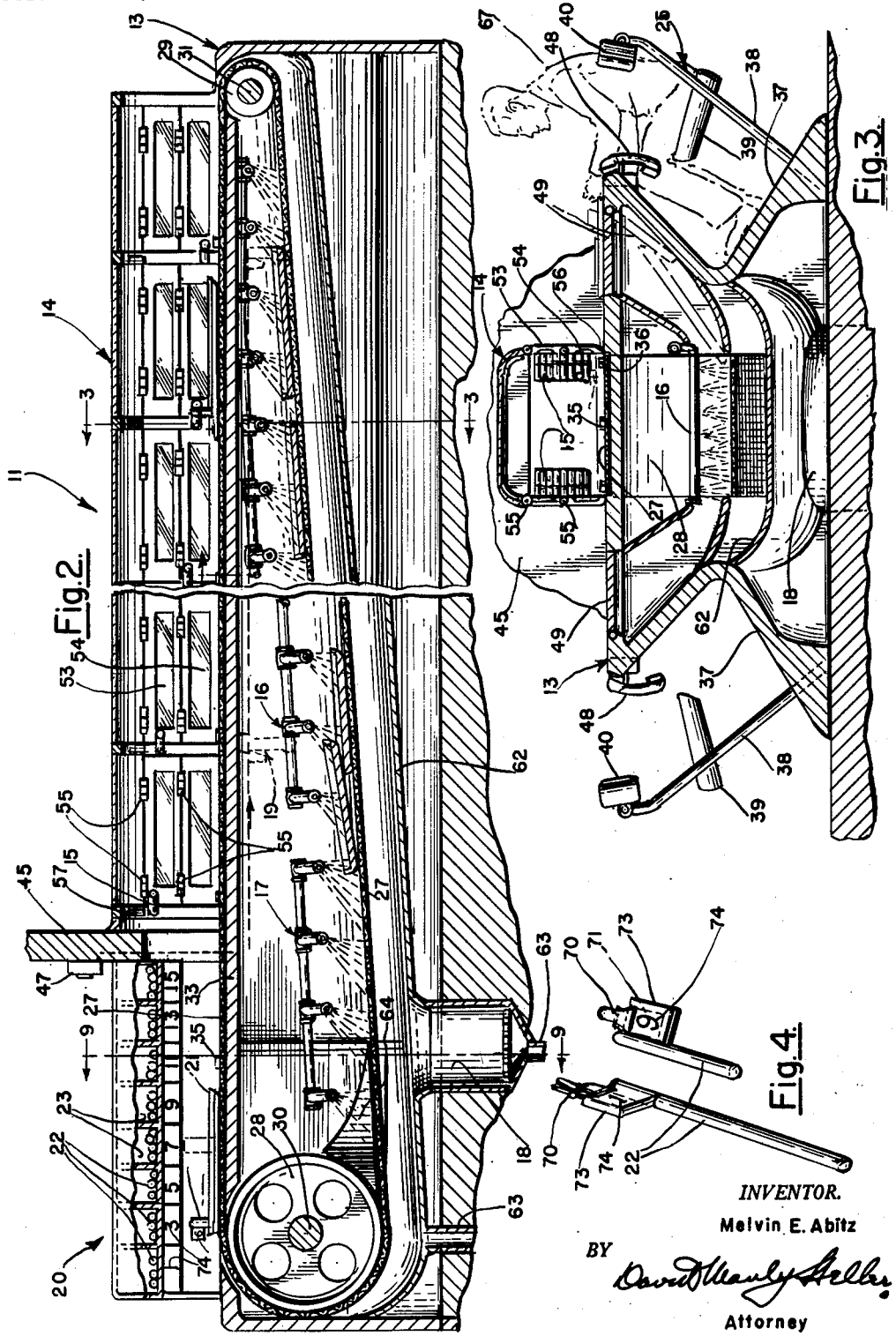
INVENTOR.
Melvin E. Abitz
BY
Attorney

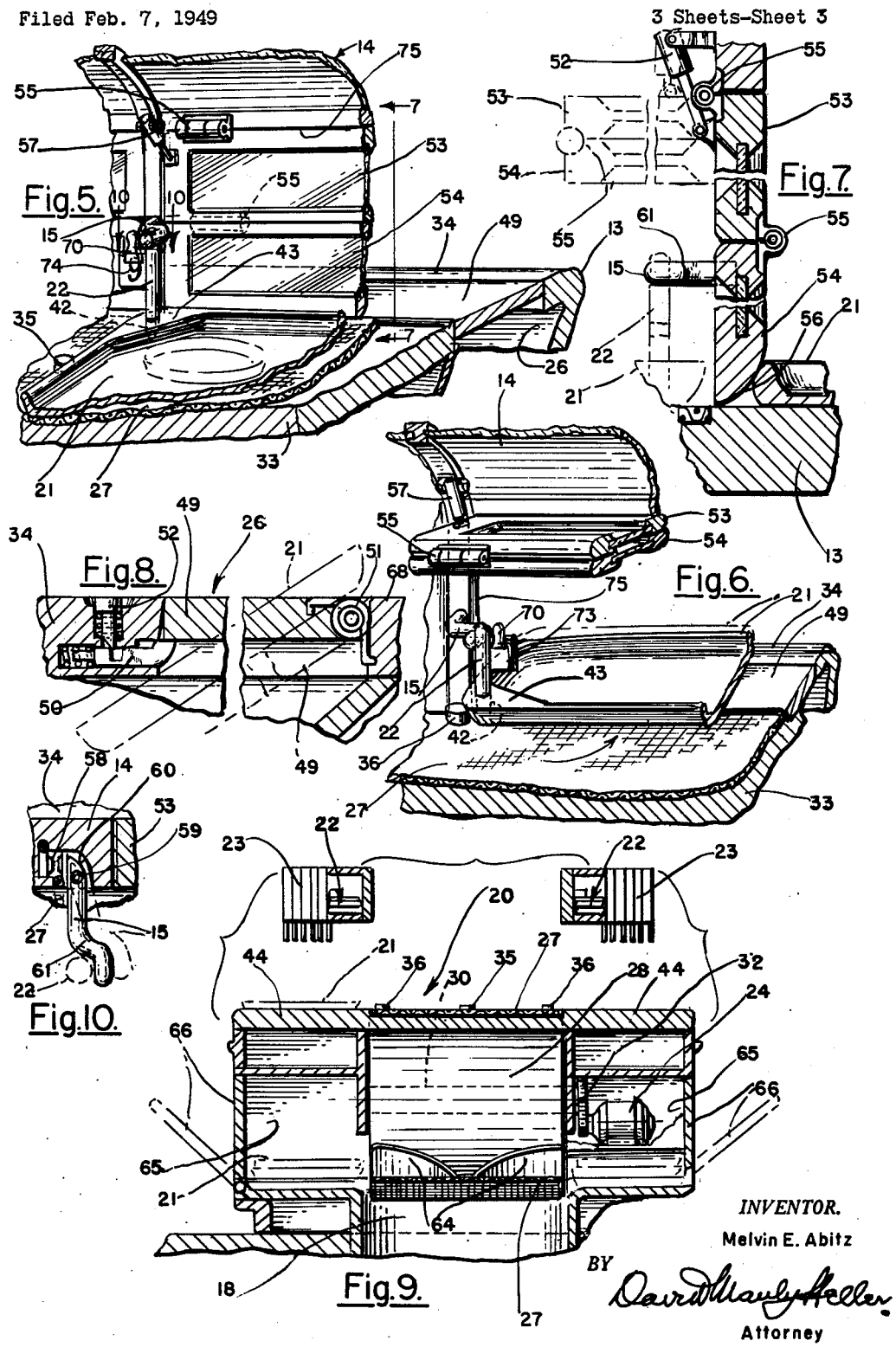

Patented June 2, 1953

2,640,581

UNITED STATES PATENT OFFICE 2,640,581

AUTOMATIC STATION-TO-STATION DELIVERY CONVEYER MEANS

Melvin E. Abitz, Chicago, Ill.

Application February 7, 1949, Serial No. 74,978

3 Claims. (Cl. 198—38)

My invention relates to automatic station to station delivery conveyor structures.

A most important object of my invention is to provide automatic station to station delivery conveyor means, which when used for example in connection with food purveying establishment will make it possible for the diner to seat himself at a food counter and through an intercommunication system call his food order to the kitchen, and have the prepared food order automatically delivered to a designated dining station on the said food counter.

A further important object of my invention is to provide automatic station to station delivery conveyor means, the conveyor belt of which in addition to delivering the food tray to a designated dining station, has the means of returning the used trays with dirty dishes and silver thereon, through a dishwashing and dishdrying structure to a receiving point in the kitchen.

A still further important object of my invention is to provide automatic station to station delivery conveyor means having gradual selector means located at each dining station which in connection with selective tray stop means on the food tray provides an arresting and turning motion to the said tray directing it from the moving conveyor to the table or counter top at the proper dining station.

A further object of my invention is to provide automatic station to station delivery conveyor means having an enclosed conveyor track with a delivery door assembly structure having door means at each dining station which automatically opens when a tray is presented thereto and closes when the said tray has passed therethrough.

A still further object of my invention is to provide automatic station to station delivery conveyor means having suitable garbage collecting and disposal means associated with the dish washing means thereof.

A further object of my invention is to provide automatic station to station delivery conveyor means, that is designed for mass production and in units of the desired seating capacity that may be assembled and mounted in stores, factories, restaurants and such places where the efficient and quick serving of food is essential.

Other objects and advantages inherent in my invention will be disclosed in the following description and the accompanying illustrations in which like parts are designated by like numerals and in which:

Fig. 2 is a longitudinal cross-sectional view of my invention taken substantially on line 2—2 on Fig. 1.

Fig. 3 is a transverse cross-sectional view of my invention taken substantially on line 3—3 on Fig. 2.

Fig. 4 is an enlarged perspective view showing details of the selective tray stop means of my invention.

Fig. 5 is an enlarged fragmentary perspective view showing one of the operative positions of the delivery door assembly.

Fig. 6 is an enlarged fragmentary perspective view of the delivery door assembly of my invention similar to that shown in Fig. 5 and showing the doors thereof in an open position and showing a tray being urged from the moving conveyor belt to the counter dining station.

Fig. 7 is an enlarged fragmentary cross-sectional view taken substantially on line 7—7 on Figs. 2 and 5 and showing the automatic assembly door opening and closing means.

Fig. 8 is an enlarged fragmentary cross-sectional view taken substantially on line 8—8 on Fig. 2 and showing details of the dishwasher feeder means.

Fig. 9 is a transverse cross-sectional view of my invention taken substantially on line 9—9 on Fig. 2.

Fig. 10 is an enlarged fragmentary cross-sectional view showing details of the gradual selector means of my invention.

Figure 1:
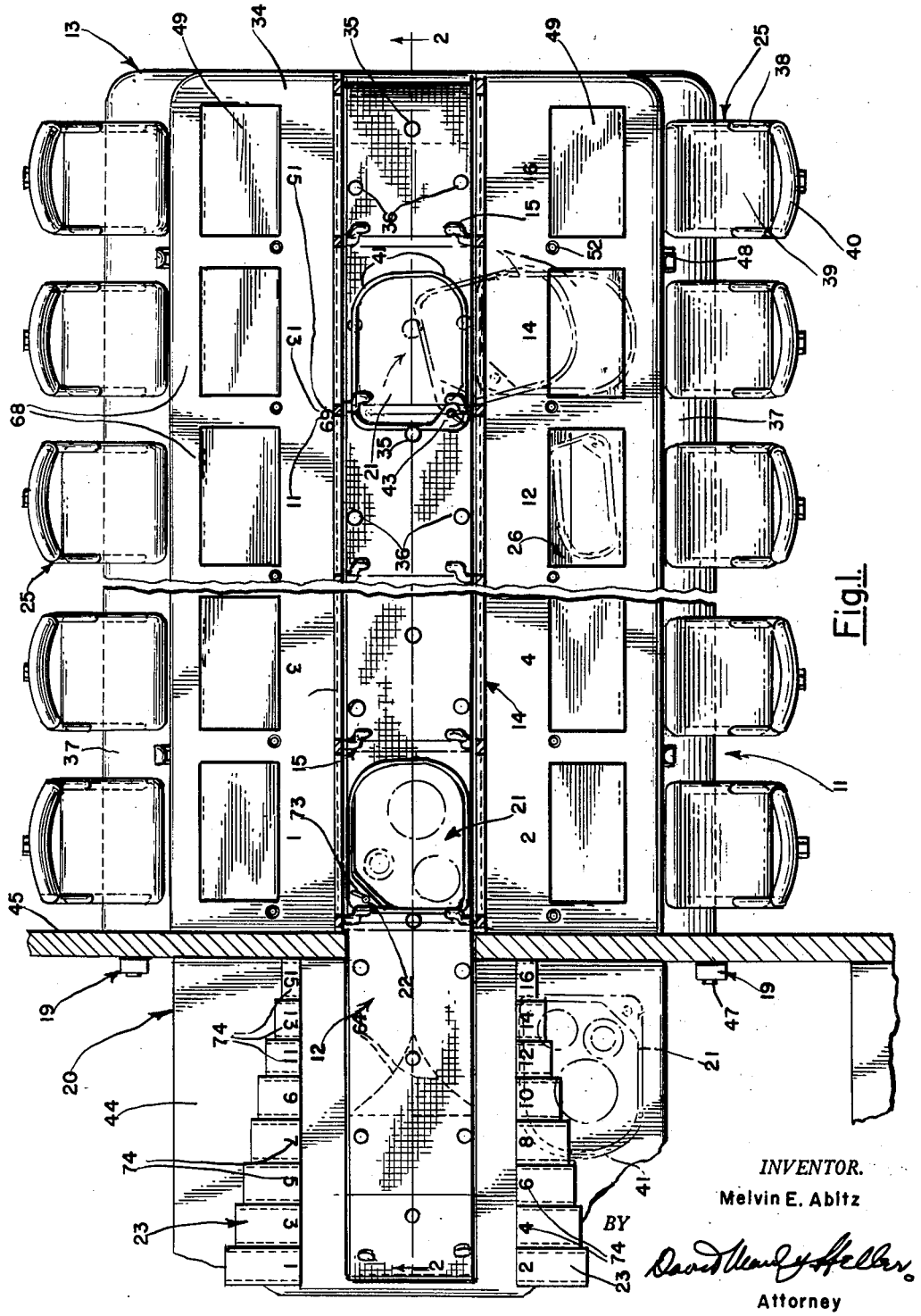
Fig. 1 is a top or plan view of my invention showing the interrelation of all the principal parts thereof.

Referring to the illustration my invention is generally designated 11 and consists of a conveyor belt assembly 12, belt support and counter means 13, conveyor housing and delivery door assembly 14, gradual selector means 15, a dishwashing structure 16, a rinsing structure 17, a garbage disposal unit 18, an intercommunication system 19 in connection with a kitchen 20. Selective tray stop means 22, conveyor tray means 21, tray stop container bins 23, prime mover means 24, a multiple seating structure 25, and a dishwasher feeder means 26 are further important sub-assemblies of my invention. The said conveyor belt assembly 12 consists of a conveyor belt 27 which may be of wire mesh, or of rubber construction or the like and which is supported and motivated between friction driving means 28 and friction idler means 29, which preferably would consist of drums mounted on a driving shaft 30 and an idler shaft 31 respectively. The driving drum 28 would preferably be of greater diameter than the idler drum 29. The said conveyor belt assembly is motivated by prime mover means 24 in connection with sprocket belt and pulley means 32, and is further supported by the conveyor support table portion 33 which with counter portion 34 forms the top of belt support and counter means 13. Tray urging lugs designated 35—36 may be spaced at intervals on conveyor belt 27 to assist in urging the loaded food tray 21 to its destination. A foot rest portion 37 in connection with counter means 13 provides anchorage for the tubular chair supports 38, upon which are mounted chair seats 39 and adjustable chair backs 40, as best shown in Fig. 3, wherein a diner designated 67 is shown drawn in phantom lines. The conveyor tray means 21 is provided with rounded tray corners 41, one of which is reinforced at 43, and counterbored at 42 for insertion of one of the selective tray stops 22.

A kitchen wall 45 in kitchen 20 is provided with an opening 46 communicating with conveyor housing and delivery door assembly 14, and the loud speaker 47 of intercommunication system 19 may be mounted thereon as shown. Telephones 48 are suitably mounted at intervals along counter portion 34. The said counter portion 34 extends on both sides of delivery door assembly 14 and is divided into dining stations designated 68, which may be numbered in sequence, the said numbers being designated 69.

The dishwasher feeder means 26 consists of trap doors 49 mounted on counter 34 one at each of the dining stations 68. The said trap doors 49 open downwardly and are maintained in a closed position by spring hinges 51 and latch means 50. A push button 52 is recessed into counter top 34 adjacent each of the trap doors 49 for operation thereof by the diner when the conveyor tray 21 and the dishes thereon is to be returned to the dishwashing structure 16. A dish rinsing structure 17 used in connection with dishwashing structure 16 provides the dishwashing and drying means for the conveyor trays 21 as they are returned by the lower tray returning portion 76 to tray receiving bin 65. Tray diverting elements 64, mounted at the end of rinsing structure 17 have a wiping action on belt portion 76 and serve to urge the washed and dried conveyor tray 21 from conveyor belt 27 into the said conveyor bin 65. A trap door 66 permits the said tray 21 to be removed from tray collecting bin 65 when desired. The conveyor housing and delivery door assembly is provided with hinged door elements 53 and 54 at each of the dining stations 68. Electric solenoids 57 operated by electric contacts 58 in connection with the gradual selector means 15 provides door opening actuation when one of the selective tray stops 22 contacts the offset portion 61 of the said gradual selector 15. Spring hinges 55, which mount door elements 53 and 54 upon conveyor housing and delivery door assembly 14 serve to return the said door elements 53 and 54 to a closed position as shown in Fig. 5, after a loaded conveyor tray 21 has been passed therethrough. The said gradual selectors 15 are mounted on the inner walls of conveyor housing and delivery door assembly 14, adjacent the door elements 53 and 54 within clearance recesses 60 and are held in place by spring urged pivots 59 as shown in detail, Fig. 10, thus permitting limited radial movement of gradual selector pins 15. Dishwashing structure 16 is further provided with a drain pan 62 and a drain 63 in connection with the above mentioned garbage disposal unit 18.

The selective tray stops 22 are graduated as to length and are kept in convenient tray stop container bins 23 in the kitchen 20 above work table 44. The said selective tray stops 22 are further provided with flags 73 upon which are inscribed numbers 74 conforming with the numbers 69 at dining stations 68. Check holding clips 70 may be mounted upon flags 73 for holding the diner check 71.

In the operation of my automatic station to station delivery conveyor means the conveyor belt assembly 12 thereof operates continuously as do the dishwashing and rinsing structures 16 and 17. A diner designated 67 shown in Fig. 3 is seated in a chair of the multiple seating structure 25 and by means of telephone 48 of intercommunication system 19 calls his order to the kitchen 20. The order is prepared upon work tables 44 and placed in a conveyor tray 21. A selective tray stop 22 is taken from the proper selective tray bin 23 having the number designated 74 thereon conforming with the number 69 of the selected dining station 68 from which the food order was phoned. The diner check 71 is clipped to flag 73 and selective tray stop 22 is inserted in dowel 42. The tray 21 together with the food thereon is placed upon the moving conveyor belt 27 to start its trip to the designated dining station 68.

As may be seen from Fig. 2, the gradual selectors 15 are so mounted upon the walls within conveyor housing and delivery door assembly 14 that each successive gradual selector 15 will be positioned at successively lower stages thereon. It will also be seen referring to Figs. 1 and 4 that the selective tray stops 22 are of graduated length and so numbered to conform with the gradual selectors 15 of the successive dining station 68. The selected tray stop 22 will engage the said gradual selector 15 as the tray 21 passes that point. The engagement of selective tray stop 22 with gradual selector 15 causes door elements 53 and 54 to be opened by closing the electrical circuit of solenoid 57. Simultaneously tray 21 being engaged by gradual selector 15 is urged forwardly by tray urging lugs 35 resulting in radially diverted cam action through the open doorway 75 and onto the dining station 68 before the diner 67. Tray urging lugs 35 and 36 in concert with gradual selector pin 15 physically contacting selective tray stop 22 facilitate the said cam urging action hereinabove described so that as the tray is completely passed through doorway 75, and as selective tray stop 22 disengages gradual selector 15, solenoid 57 is de-energized and the door elements 53 and 54 are permitted to be closed by the spring hinges 55. The limited radial movement of gradual selector pin 15 permits pin 22 to slide off obliquely from the offset portion 61 of pin 15 thus completely freeing the tray 21. The used trays 21 are returned by the diner to dishwashing structure 16 through the hereinabove described trap doors 26. The lower edge of door element 54 is rounded at 56 to prevent the said door 54 from closing on the edge of tray 21.

Important uses for my invention would include food purveying shops such as restaurants, and also stores, factories, and other places where people are employed and must be fed with expedition and efficiency. When used in connection with food purveying establishments, my food conveying means may be operated with the minimum of help, requiring hardly more than kitchen help and cashier, eliminating bus boys, dishwashers, waiters, waitresses and the like.

A further important advantage of my invention is the hygenic feature of its operation in which trays of partly consumed food are not allowed to accumulate as is the case in other types of food establishments.

Although my invention has been described, the terms used are to be deemed terms of description rather than terms of limitation, my intention being to retain the right to all mechanical equivalents of the structural elements depicted, provided they fall within the purview of the appended claims.

Having thus disclosed and revealed my invention, what I claim as new and desire to secure by Letters Patent is:

1. Automatic station-to-station conveyor means comprising, conveyor belt assembly support means, endless conveyor belt assembly means mounted thereon provided with tray urging lugs on the longitudinal axis thereof, and further provided with lateral rest lugs to support a conveyor tray, conveyor belt housing and delivery door assembly means of tunnel-like formation mounted to straddle the said endless conveyor belt assembly means, gradual horizontally mounted selector pin means mounted at different levels on the said conveyor belt housing and delivery door assembly means, plural delivery door means hingedly secured to the said conveyor belt housing and delivery door assembly, spring means normally urging the said delivery door means to closed position, electric solenoid means connected interiorly of the said delivery door means and adapted to open same when energized, conveyor tray means adapted to be moved upon the said endless conveyor belt assembly means, vertically mounted selective tray pin arresting means of varied lengths secured to the said conveyor tray means and adapted to engage a specific gradual selector pin thereby effectuating opening of a door of the said conveyor belt housing and delivery door assembly means, and electric circuit means interconnecting the said electric solenoid means to the said gradual selector pin means and to the said selective tray pin arresting means, physical contact of both of the aforementioned pin means closing the said electrical circuit to energize the said electric solenoid means to open the said delivery door means simultaneously causing the said gradual selector pin means in concert with the said tray pin arresting means to divert the said conveyor tray means radially through the said delivery door means, tray propelling lug means secured to the said endless conveyor belt assembly means and engaging an edge of a tray to effectively propel and convey the same through an open door of the said conveyor belt housing and delivery door assembly means.

2. Automatic station-to-station conveyor means comprising, conveyor belt assembly support means, endless conveyor belt assembly means mounted thereon provided with tray urging lugs on the longitudinal axis thereof, and further provided with lateral rest lugs to support a conveyor tray, conveyor belt housing and delivery door assembly means of tunnel-like formation mounted to straddle the said endless conveyor belt assembly means, gradual horizontally mounted selector pin means mounted at different levels on the said conveyor belt housing and delivery door assembly means, plural delivery door means hingedly secured to the said conveyor belt housing and delivery door assembly, spring means normally urging the said delivery door means to closed position, electric solenoid means connected interiorly of the said delivery door means and adapted to open same when energized, conveyor tray means adapted to be moved upon the said endless conveyor belt assembly means, vertically mounted selective tray pin arresting means of varied lengths secured to the said conveyor tray means and adapted to engage a specific gradual selector pin thereby effectuating opening of a door of the said conveyor belt housing and delivery door assembly means, electric circuit means interconnecting the said electric solenoid means to the said gradual selector pin means and to the said selective tray pin arresting means, physical contact of both of the aforementioned pin means closing the said electrical circuit to energize the said electric solenoid means to open the said delivery door means simultaneously causing the said gradual selector pin means in concert with the said tray pin arresting means to divert the said conveyor tray means radially through the said delivery door means, tray propelling lug means secured to the said endless conveyor belt assembly means and engaging an edge of a tray to effectively propel and convey the same through an open door of the said conveyor belt housing and delivery door assembly means, the said conveyor belt assembly support means being subdivided into a tray purveying section and a tray loading section, and means for storing a variety of said selective tray arresting means within the said tray loading section.

3. Automatic station-to-station conveyor means comprising, conveyor belt assembly support means, endless conveyor belt assembly means mounted thereon provided with tray urging lugs on the longitudinal axis thereof, and further provided with lateral rest lugs to support a conveyor tray, conveyor belt housing and delivery door assembly means of tunnel-like formation mounted to straddle the said endless conveyor belt assembly means, gradual horizontally mounted selector pin means mounted at different levels on the said conveyor belt housing and delivery door assembly means, plural delivery door means hingedly secured to the said conveyor belt housing and delivery foor assembly, spring means normally urging the said delivery door means to closed position, electric solenoid means connected interiorly of the said delivery door means and adapted to open same when energized, conveyor tray means adapted to be moved upon the said endless conveyor belt assembly means, vertically mounted selective tray pin arresting means of varied lengths secured to the said conveyor tray means and adapted to engage a specific gradual selector pin thereby effectuating opening of a door of the said conveyor belt housing and delivery door assembly means, electric circuit means interconnecting the said electric solenoid means to the said gradual selector pin means and to the said selective tray pin arresting means, physical contact of both of the aforementioned pin means closing the said electrical circuit to energize the said electric solenoid means to open the said delivery door means simultaneously causing the said gradual selector pin means in concert with the said tray pin arresting means to divert the said conveyor tray means radially through the said delivery door means, tray propelling lug means secured to the said endless conveyor belt assembly means and engaging an edge of a tray to effectively propel and convey the same through an open door of the said conveyor belt housing and delivery door assembly means, the said gradual selector means being disposed initially in its uppermost position diminishing in height gradually toward the terminus of the said conveyor belt housing and delivery door assembly to a selector in its lowermost position.

MELVIN E. ABITZ.

References Cited in the file of this patent

UNITED STATES PATENTS

| Number | Name | Date |
|---|---|---|
| 636,557 | Reeves | Nov. 7, 1899 |
| 695,400 | Knott | Mar. 11, 1902 |
| 1,031,186 | LaPlace | July 2, 1912 |
| 1,439,825 | Kuhn | Dec. 26, 1922 |
| 1,781,424 | Anderson | Nov. 11, 1930 |
| 1,804,154 | Cowley | May 5, 1931 |
| 1,820,564 | Hall | Aug. 25, 1931 |
| 1,825,951 | Hall | Oct. 6, 1931 |
| 1,865,596 | Starks | July 5, 1932 |
| 1,881,898 | Olson | Oct. 11, 1932 |
| 1,965,454 | Cody | July 3, 1934 |
| 2,280,221 | Dambach, Jr. | Apr. 21, 1942 |
| 2,353,638 | Beaulieu | July 18, 1944 |
| 2,516,985 | Hecht | Aug. 1, 1950 |